(12) United States Patent
Ostuni et al.

(10) Patent No.: US 11,565,937 B2
(45) Date of Patent: Jan. 31, 2023

(54) PROCESS FOR PRODUCING A HYDROGEN-CONTAINING SYNTHESIS GAS

(71) Applicant: CASALE SA, Lugano (CH)

(72) Inventors: Raffaele Ostuni, Lugano (CH); Ermanno Filippi, Castagnola (CH)

(73) Assignee: CASALE SA, Lugano (CH)

( * ) Notice: Subject to any disclaimer, the term of this patent is extended or adjusted under 35 U.S.C. 154(b) by 83 days.

(21) Appl. No.: 16/772,952

(22) PCT Filed: Dec. 5, 2018

(86) PCT No.: PCT/EP2018/083580
§ 371 (c)(1),
(2) Date: Jun. 15, 2020

(87) PCT Pub. No.: WO2019/120999
PCT Pub. Date: Jun. 27, 2019

(65) Prior Publication Data
US 2021/0163286 A1    Jun. 3, 2021

(30) Foreign Application Priority Data

Dec. 21, 2017   (EP) .................................... 17209315

(51) Int. Cl.
*C01B 3/02*    (2006.01)
*C01B 3/38*    (2006.01)

(52) U.S. Cl.
CPC .............. *C01B 3/025* (2013.01); *C01B 3/384* (2013.01); *C01B 2203/0233* (2013.01);
(Continued)

(58) Field of Classification Search
CPC .... C01B 3/02; C01B 3/04; C01B 3/00; C01B 21/00; C01B 21/02; C01B 3/025;
(Continued)

(56) References Cited

U.S. PATENT DOCUMENTS 2,013,809 A    9/1935  Hall
4,668,494 A *  5/1987  Van Hook .............. B01J 19/127
                                             252/376

(Continued)

FOREIGN PATENT DOCUMENTS

CN    101538013 A    9/2009
CN    103025649 A    4/2013
(Continued)

OTHER PUBLICATIONS

International Search Report from International Application No. PCT/EP2018/083580 dated Feb. 14, 2019.
(Continued)

*Primary Examiner* — Steven J Bos
*Assistant Examiner* — Syed T Iqbal
(74) *Attorney, Agent, or Firm* — Dorsey & Whitney LLP

(57) ABSTRACT

Process including the production of a hydrogen-containing synthesis gas by conversion of a hydrocarbon feedstock, wherein said process has a heat input provided by combustion of a plurality of process fuel streams and said plurality of process fuel streams comprises at least one fuel stream of ammonia. Combustion of said at least one fuel stream of ammonia is performed non-catalytically in at least one fired equipment.

25 Claims, 2 Drawing Sheets

(52) U.S. Cl.
CPC ........... *C01B 2203/0244* (2013.01); *C01B 2203/0283* (2013.01); *C01B 2203/043* (2013.01); *C01B 2203/061* (2013.01); *C01B 2203/068* (2013.01); *C01B 2203/0822* (2013.01); *C01B 2203/0827* (2013.01); *C01B 2203/1241* (2013.01); *C01B 2203/142* (2013.01); *C01B 2203/1604* (2013.01)

(58) Field of Classification Search
CPC . C01B 3/047; C01B 3/384; C01B 2203/0233; C01B 2203/0244; C01B 2203/0283; C01B 2203/043; C01B 2203/061; C01B 2203/068; C01B 2203/0822; C01B 2203/0827; C01B 2203/1241; C01B 2203/142; C01B 2203/1604; C01B 2203/0811; C01B 2203/1235; Y02E 60/364; Y02P 20/10; Y02P 20/129
See application file for complete search history.

(56) References Cited

U.S. PATENT DOCUMENTS

| | | |
|---|---|---|
| 4,728,506 A | 3/1988 | Habermehl et al. |
| 10,138,785 B2 | 11/2018 | Hiltunen et al. |
| 2011/0042620 A1* | 2/2011 | Singh .............. C01B 3/382 422/627 |
| 2011/0206594 A1 | 8/2011 | Singh et al. |
| 2012/0148925 A1* | 6/2012 | Grannell .......... F23D 14/62 429/408 |

FOREIGN PATENT DOCUMENTS

| | | |
|---|---|---|
| GB | 1206729 A | 9/1970 |
| RU | 2225356 C2 | 3/2004 |
| RU | 2495327 C2 | 10/2013 |
| RU | 2502670 C2 | 12/2013 |
| RU | 2615873 C1 | 4/2017 |
| RU | 2621671 C1 | 6/2017 |
| SU | 920324 A1 | 4/1982 |
| SU | 1770277 A1 | 10/1992 |
| WO | 2015117737 A1 | 8/2015 |

OTHER PUBLICATIONS

International Preliminary Report on Patentability for International Application No. PCT/EP2018/083580 completed Jan. 23, 2020.

Wu, et al., "Conceptual Design Study of a Soalr Ammonia/Nitric Acid Production System", 21 st Inersociety Energy Conversion Engineering Conference San Dieo, California, XP001266112, Aug. 25, 1986, pp. 839-845.

* cited by examiner

PROCESS FOR PRODUCING A HYDROGEN-CONTAINING SYNTHESIS GAS

FIELD OF APPLICATION

The invention relates to a process for producing a hydrogen-containing synthesis gas from a hydrocarbon feedstock. In particular, the invention relates to a process for producing a hydrogen-containing synthesis gas with low emissions of $CO_2$ in atmosphere.

PRIOR ART

The production of a hydrogen-containing synthesis gas from a hydrocarbon feedstock usually involves a combined reforming process in which a primary reformer is fed with desulphurized hydrocarbons and steam and a secondary reformer receives the partially reformed gas from the primary reformer and a flow of a suitable oxidant (for example air or oxygen). The production of a hydrogen-containing synthesis gas from a hydrocarbon feedstock may also involve an autothermal reforming (ATR) in a suitable reformer preceded by a furnace for heating the charge, i.e. the gaseous hydrocarbon feedstock.

The reformed gas is then typically treated in a series of down-stream equipment to obtain a product gas, for example hydrogen or a synthesis gas with a composition suitable for making ammonia (i.e. comprising $H_2$ and $N_2$ in a suitable ratio of about 3:1) or for making methanol (i.e. comprising carbon oxides and hydrogen with a stoichiometric number $SN \geq 2$, wherein $SN=(H_2-CO_2)/(CO+CO_2)$).

The production of hydrogen-containing synthesis gas requires combustion of at least a first amount of a fuel for generating the reforming heat; a second amount of fuel is typically also consumed to produce steam and to power steam turbines which drive machines such as pumps or compressors.

For this purpose, a common approach is to use a portion of the hydrocarbon feedstock as fuel. However, it provides significant emissions of $CO_2$ into the atmosphere. One of the main sources of $CO_2$ emission consists in the flue gas of the primary reformer and other burner furnaces, if any, for example auxiliary heaters.

For environmental reasons, it is required to minimize the $CO_2$ emissions from said flue gas.

According to the present state of the art, methods for reducing the $CO_2$ emissions include post-combustion processes which capture $CO_2$ from flue gas, e.g. by means of a washing with suitable solvents (for example the solvent KS-1™ produced by Mitsubishi). However, said solvents are expensive and the associated plants are costly and energy-demanding.

$CO_2$ emissions also constitute an issue during the start-up of a chemical plant, which may last for days or weeks and involve a considerable emission of $CO_2$.

The known techniques for post-combustion capture of $CO_2$ include absorption in a solvent (e.g. amine); temperature swing adsorption (TSA), pressure swing adsorption (PSA), vacuum swing adsorption (VSA) and membrane-based separation. These techniques require an input of heat, e.g. for regeneration of a TSA system, and/or input of mechanical power, e.g. for compression of the feed gas in a PSA system or for extraction of CO2 under vacuum in a VSA system. During normal operation, this heat input or power input can be internally recovered, for example from waste heat. During start-up however the recovery of heat or power is not available because the plant is not operational.

The generation of the required input by means of auxiliary equipment, such as a fuel-fired auxiliary steam boiler, would introduce carbon dioxide emissions. Import from an external source, such as import of electric power from the grid, is generally very expensive.

Accordingly, the reduction of $CO_2$ emissions during start-up of a chemical plant, particularly a plant for the synthesis of ammonia, is still an open issue. More generally, the same problem may emerge during a transient when the internal recovery of the heat and/or power required by a $CO_2$ removal system is not available.

US 2011/0206594 describes a background art of a system and method for producing syngas.

U.S. Pat. No. 4,728,506 discloses a start-up method for ammonia plants which employs ammonia as a start-up media by introducing ammonia into a reformer stage to form ammonia-containing start-up synthesis gas and heating and cycling said gas until the plant is brought to operational temperature. However is does not address the problem of $CO_2$ emissions from fired equipment during the start-up phase.

U.S. Pat. No. 4,668,494 discloses a method of using solar energy in a chemical synthesis process which may use, as a heat source, the catalytic oxidation of ammonia in an unfired ammonia burner wherein ammonia is oxidized over a catalytic gauze to form nitrogen oxides for subsequent synthesis of nitric acid.

SUMMARY OF THE INVENTION

The object of the present invention is to provide a process for producing a hydrogen-containing synthesis gas from a hydrocarbon source with $CO_2$ emissions into the atmosphere which are greatly reduced compared to the prior art. Another aim of the invention is to reduce the $CO_2$ emission during transients, particularly during start-up.

This object is achieved with a process according to claim 1.

The process according to the invention has a heat input provided by combustion of a plurality of process fuel streams and is characterized in that said plurality comprises at least one fuel stream of ammonia and in that the combustion of said at least one fuel stream of ammonia is performed non-catalytically in at least one fired equipment.

The combustion of said at least one fuel stream of ammonia is performed non-catalytically (i.e. in absence of any catalyst to promote oxidation of ammonia). The term of fired equipment denotes that the combustion is made with formation of a flame.

The non-catalytic fired combustion of ammonia converts the ammonia into molecular nitrogen $N_2$ and water, with only minor amounts of nitrogen oxides. Accordingly the products of the combustion consist predominantly of $N_2$ and water. Typically the nitrogen oxides formed in the referred non-catalytic combustion of ammonia are less than 1000 ppmv (i.e. on volume basis in the flue gas) and preferably less than 100 ppmv.

As the ammonia-fired combustion produces $N_2$ and $H_2O$, no $CO_2$ is released into atmosphere during the combustion of the fuel stream of ammonia.

The fuel stream of ammonia is also referred to as ammonia fuel.

The at least one fired equipment is for example a fired heater. Said at least one fired equipment may belong, for example, to a reforming section, a partial oxidation section or a purification section.

The non-catalytic combustion of ammonia can be effected in conventional gas burners which are not specifically designed to burn ammonia.

Said at least one fuel stream of ammonia is preferably a substantially pure ammonia. In some embodiments said at least one fuel stream of ammonia comprises predominantly ammonia. According to some embodiments, said at least one fuel stream of ammonia preferably contains at least 90% ammonia, more preferably at least 95%.

Said fuel stream of ammonia can be combusted directly or after mixing with a different gas. In some embodiments, a fuel stream of ammonia, or a plurality of fuel streams of ammonia, are mixed with a different gas to form a mixed fuel, before combustion. Said different gas for example is hydrogen. Some embodiments for example may include mixing a stream of ammonia with a stream of hydrogen to obtain a fuel stream including both ammonia and hydrogen in a suitable ratio, e.g. 50% each.

Preferably, said hydrocarbon-feedstock is natural gas. Reference will be made in the description below to natural gas as a non-limiting example.

Said conversion of the hydrocarbon feedstock gas may include reforming or partial oxidation of natural gas into a reformed gas or partially oxidized gas, respectively. Preferably, said conversion of the hydrocarbon feedstock comprises a reforming step including at least one among: a fired primary reforming, a gas heated reforming (GHR), an air- or oxygen-fired secondary reforming and an auto-thermal reforming (ATR).

The reforming step is carried out in a reforming section. According to various embodiments, said reforming section includes at least one of a fired primary steam reformer and a gas heated reformer (GHR), and optionally a secondary reformer fed with air, oxygen or enriched air. According to other embodiments, the reforming section includes an auto-thermal reformer (ATR). A pre-reformer may also be included in any of the above embodiments. Furthermore, a pre-heater may also be arranged to preheat the feed of the pre-reformer or the feed of the auto-thermal reformer.

Said heat input may include a process heat, e.g. of the primary reformer or charge pre-heater, and/or heat for production of steam to drive steam turbines for compressors, pumps or the like.

Accordingly, said heat input is supplied to at least one of the following apparatuses: a fired primary reformer, a mixed hydrocarbon and steam feed pre-heater, an auxiliary steam generator, a desulphurization pre-heater, a steam super-heater, an HRSG (Heat Recovery Steam Generator) cooling the exhaust of a gas turbine, a gas turbine (for power generation or for driving a machine such as a compressor). These apparatuses, which operate by means of combustion of a fuel, are identified by the term "fired heaters".

Combustion of said at least one fuel stream of ammonia preferably provides up to 50% of the total heat input of the process, preferably up to 30%, more preferably up to 15%. Said percentages may be expressed as the product between the flowrate (kg/s or mol/s) and the heat value (J/kg or J/mol).

Preferably, said at least one fuel stream of ammonia is supplied as a gaseous or vapour stream to one or more of said fired heaters for combustion. A related advantage is that gas phase burners can be used; furthermore, combustion of a gaseous or vapour fuel allows higher flame temperatures than combustion of a liquid fuel.

Preferably, said at least one fuel stream of ammonia is pre-heated before being supplied to said fired heater(s). An advantage is that more heat may be released upon combustion. Furthermore, pre-heated ammonia can be advantageously supplied as gas to the fired heater(s) at a pressure greater that 1 atm.

In a preferred embodiment, said at least one fuel stream of ammonia is vaporized before being supplied to said fired heater(s). In a further preferred embodiment, ammonia is vaporized by cooling another stream, thereby recovering frigories from ammonia. For example, ammonia is vaporized by cooling a compressor stage suction stream, thereby reducing the power consumption of the compressor itself.

According to a preferred embodiment, the above mentioned plurality of process fuel streams includes a hydrogen-rich fuel stream with a low carbon content, in addition to said at least one fuel stream of ammonia.

Combustion of said hydrogen-rich stream preferably provides at least 50% of the total heat input of the process, preferably at least 70%, more preferably at least 85%. Said percentages may be expressed as the product between the flowrate (kg/s or mol/s) and the heat value (J/kg or J/mol).

Ammonia can be stored at about −33° C. in a refrigerated tank at atmospheric pressure, or at moderate pressure and ambient temperature (e.g. 15 bar at 30° C.), with high volumetric energy density of about 3 Gcal/m3, calculated as the product of mass density and lower heating value (LHV).

According to a preferred embodiment, said plurality of process fuel streams includes at least one fuel stream of ammonia supplied by a storage tank. If the process produces ammonia, some of the ammonia product can be stored in a tank for use as a fuel in accordance with the invention. According to a preferred embodiment, a fuel stream of ammonia from an ammonia storage tank is supplied as trim fuel to the above mentioned fired heaters.

The term "trim fuel" denotes a fuel feed specifically for a quick heat regulation, i.e. which allows the fired heaters to be rapidly controlled and work at maximum efficiency. Preferably, said trim fuel accounts for not more than 15%, more preferably not more than 10%, of the total combustion heat of the process. Said trim fuel may be supplied with a separate feed line.

An advantage of supplying the trim fuel from a storage tank is that said fuel is independent of the process. This is particularly advantageous during transients, e.g. start-up, because allows a faster fuel supply.

The ammonia trim fuel supplied by said storage tank can be all the ammonia used as fuel in the process, or only a portion thereof.

Supplying ammonia trim fuel is advantageous because of the possibility to control the fired duty of the fired heaters without emitting $CO_2$ in the atmosphere, independently of the production process. This is of the utmost importance, especially during transients such as the start-up, so as to reach near complete elimination of carbon emissions without negatively impacting the plant operability. For example during operation of the plant, ammonia trim fuel flow rate can be adjusted, namely increased or decreased, to compensate variations of the flow rate of a hydrogen-rich fuel stream.

According to a preferred embodiment, combustion of said trim fuel provides the total heat input required during transients such as the start-up.

A portion of ammonia of said trim fuel is preferably decomposed or cracked into its constituents, namely nitrogen ($N_2$) and hydrogen ($H_2$) according to the following reaction:

$$2\ NH_3 \leftrightarrows N_2 + 3\ H_2.$$

A related advantage is an easier combustion of the start-up fuel stream because hydrogen ($H_2$) has faster combustion kinetics than ammonia and acts as a combustion promoter for ammonia. The applicant has found that hydrogen facilitates the combustion of the fuel stream of ammonia and leads to a better stability of flame.

Said reaction of decomposition is endothermic and limited by equilibrium and requires high temperatures to reach a conversion greater than 50%. Advantageously, the portion of fuel stream of ammonia undergoing said reaction of decomposition is not greater than 50% of the overall stream, more preferably not greater than 30%. As a consequence, a moderate energy is needed for decomposition of such portion of ammonia, which can therefore be operated at moderate temperatures. The energy to drive the decomposition of ammonia reaction may be imported as electricity.

Storage of ammonia is advantageous compared to storage of other fuels, e.g. hydrogen. Storage of a hydrogen-rich stream for use as trim fuel is impractical because hydrogen is liquefied at much lower temperature (about −253° C.), and liquefaction requires high energy consumption. Storage of hydrogen as compressed gas is also impractical due to high pressure required to reach a high energy density. At a pressure of 200 bar, gaseous hydrogen has an energy density of only 0.4 Gcal/m3.

In a particular embodiment of the invention, said conversion of the hydrocarbon feedstock provides a raw product gas containing hydrogen, CO and $CO_2$ and said raw product is purified by removing $CO_2$ and obtaining a $CO_2$-depleted synthesis gas. In a preferred embodiment, removal of $CO_2$ is performed after a shift reaction which converts carbon monoxide (CO) into carbon dioxide. Preferably, the above mentioned hydrogen-rich fuel stream comprises or consists of a portion of said $CO_2$-depleted synthesis gas, the remaining portion of said $CO_2$-depleted gas being directed to a specific use, e.g. to the synthesis of ammonia.

Using at least one fuel stream of ammonia together with a hydrogen-rich fuel stream has the following advantages: a lower consumption of ammonia and a lower overall energy consumption, while keeping low $CO_2$ emissions into atmosphere. A further advantage is an easier combustion of the fuel stream of ammonia; this is because hydrogen has fast combustion kinetics and acts as combustion promoter for ammonia, which has slower combustion kinetics.

A preferred application of the present invention includes a process for making ammonia. According to this application, the hydrogen-containing synthesis gas comprises hydrogen ($H_2$) and nitrogen ($N_2$) in a molar ratio of about 3:1 and is catalytically reacted in a high-pressure synthesis loop to produce an ammonia product.

Preferably, a portion of said ammonia product is recycled to the process as a fuel stream of ammonia. More preferably, a further fuel stream of ammonia is supplied as trim fuel by a storage tank. Providing said trim fuel has the advantage of an easy regulation of the fired duty, without impacting on the production process.

The ammonia product is liquid and has a high pressure of about 100 to 200 bar. Separating said at least one fuel stream of ammonia from said ammonia product has some advantages. First of all, liquid ammonia can be preheated recovering waste heat from the process; accordingly, more heat can be released upon combustion. Furthermore, said at least one fuel stream of ammonia can be expanded to the pressure of the combustion in a machine, thus recovering energy.

In addition to said ammonia product, a purge gas is released by the synthesis loop and said purge gas is subsequently treated in a dedicated unit for the recovery of hydrogen contained therein. Said hydrogen-recovery unit provides a hydrogen-rich gas stream and a tail gas. In some embodiments, said plurality of process fuel streams further includes any of: at least a portion of said tail gas; at least a portion of said hydrogen-rich gas; at least a portion of said purge gas before the hydrogen recovery. These streams can be in addition to said at least one fuel stream of ammonia. In some embodiments an additional fuel stream comprises also a portion of the above identified $CO_2$-depleted gas.

Another application of the invention includes a process for making methanol. According to this application, the synthesis gas is a mixture of carbon oxides and hydrogen, and said synthesis gas is catalytically reacted in a synthesis loop to produce methanol.

A purge stream containing unreacted synthesis gas is also continuously withdrawn from a methanol synthesis loop. According to some embodiments of the invention, said purge stream may be subject to hydrogen recovery in a suitable hydrogen recovery unit (HRU) producing a hydrogen-rich gas and a tail gas. The purge stream, as well as the hydrogen-rich gas and/or the tail gas from a HRU, may provide one or more fuel streams in some embodiments.

Preferably, said plurality of process fuel streams also includes a hydrogen-rich fuel stream, and said hydrogen-rich fuel stream comprises or consists of at least a portion of said purge stream. Preferably, said at least a portion of purge stream has been previously subjected to removal of at least part of the carbon-containing compounds. Said carbon-containing compounds may include $CO_2$ and compounds that would produce $CO_2$ upon combustion, e.g. CO, $CH_4$, methanol.

According to a preferred embodiment, said at least one fuel stream of ammonia is co-produced with methanol, so as to avoid purchasing the ammonia fuel stream.

A further application of the invention includes a process for the production of hydrogen. Preferably, said at least one fuel stream of ammonia is co-produced with hydrogen.

However, combustion of ammonia generates NOx (e.g. NO, $NO_2$), which are known pollutants and the related emissions are subject to strict regulations. A gas vented into atmosphere may be required to meet very low limits of NOx, for example a maximum content of 100 ppm or even less.

The process according to the invention preferably comprises a step of selective catalytic reduction (SCR) in order to reduce the NOx emissions. Preferably, SCR includes catalytic reduction of NOx by means of a stream of ammonia as reducing agent. Preferably, said stream of ammonia is separated from the at least one fuel stream of ammonia. Hence, there is no need to separately produce or purchase the ammonia reducing agent.

Another aspect of the present invention is a method for revamping a plant for the synthesis of ammonia according to the attached claim. In the method of the invention, part of the produced ammonia is used to fire at least one fired equipment (e.g. a primary reformer) of the plant.

The ammonia fuel can be sent directly to said at least one fired equipment or, more preferably, stored into a suitable ammonia fuel tank. The method of revamping may therefore include the installation of said ammonia fuel tank.

An ammonia plant may be revamped in order to increase its capacity, so that the extra capacity provides the required ammonia fuel, i.e. ammonia to be used as fuel in the at least one fired equipment.

Still another aspect of the invention includes the use of said least one fuel stream of ammonia during a transient or a start-up phase. The term transient denotes a condition where the operational parameters deviates from standard operation and, consequently, the internal recovery of the energy input for a carbon capture system (e.g. regeneration heat for a TSA capture system) is temporarily unavailable.

Ammonia fuel for use in a transient phase or start-up phase can be stored in a suitable tank.

An aspect of the invention is a method for start-up of a chemical plant including the use of ammonia as a fuel for at least one fired equipment of the plant during a start-up phase of the plant.

The method of start-up can be applied to a plant for the synthesis of ammonia or to a different chemical plant, for example to a plant for the synthesis of methanol. In case of a plant for the synthesis of ammonia, the ammonia fuel combusted during start-up may be part of the ammonia produced internally. The ammonia fuel is preferably stored in a suitable ammonia fuel tank.

In all embodiments the ammonia fuel is combusted non-catalytically with the formation of a flame.

The advantages of the invention will be elucidated with the help of the following description of preferred and non-limiting embodiments.

DESCRIPTION OF PREFERRED EMBODIMENTS OF THE INVENTION

Figure 1:
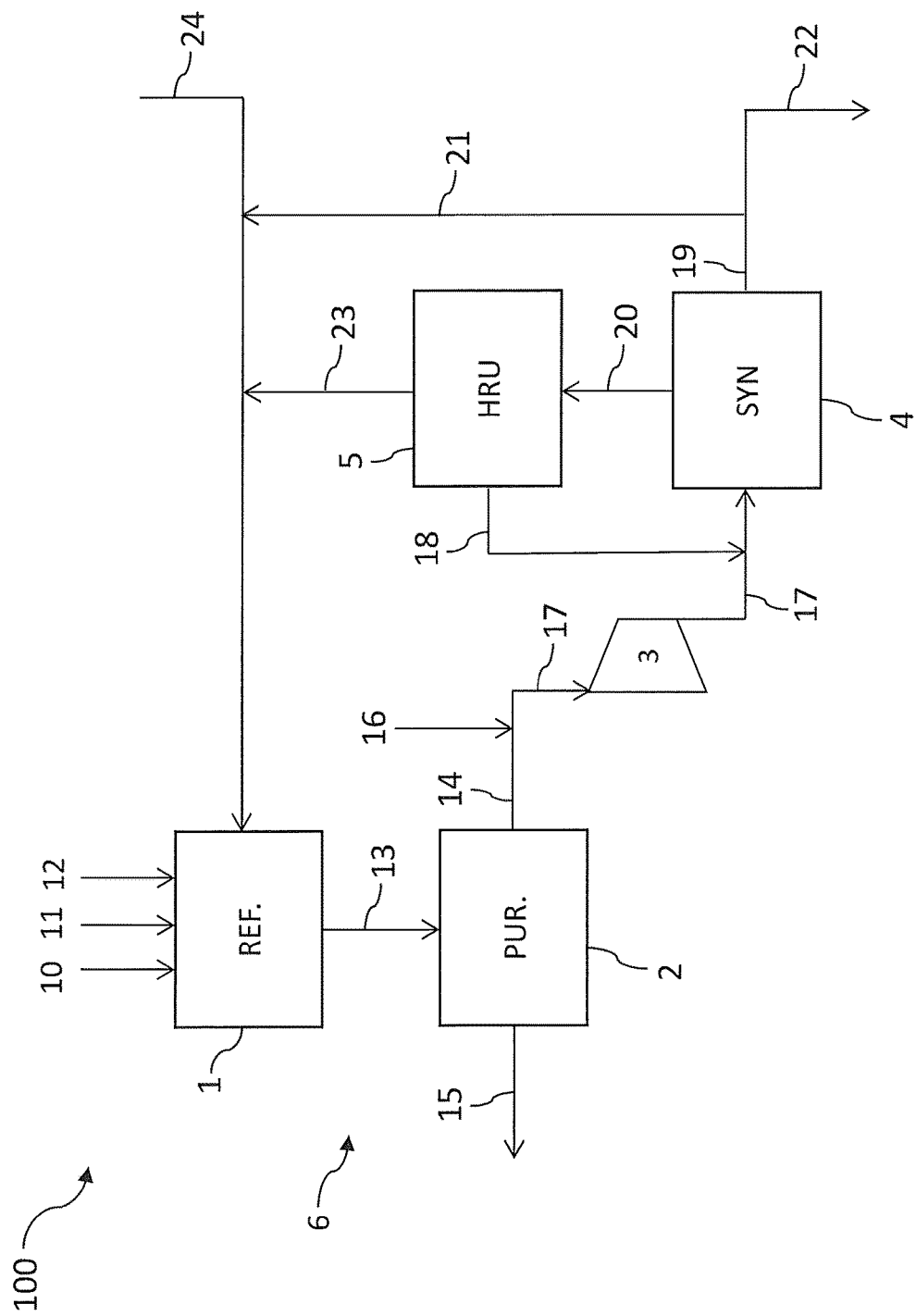
FIG. 1 shows a first embodiment of the invention.

FIG. 1 illustrates a block scheme of a plant 100 for the synthesis of ammonia essentially comprising a reforming section 1, a purification section 2, a multi-stage compressor 3, a synthesis section 4 and a hydrogen-recovery unit 5. The reforming section 1 and the purification section 2 are part of a front-end section 6.

A stream 10 of natural gas is supplied to the reforming section 1, wherein it is reformed in the presence of steam 11 and an oxidant 12 (e.g. air or enriched air) providing a raw synthesis gas 13 mostly composed of hydrogen and containing minor amounts of other components including e.g. carbon monoxide, carbon dioxide, water, methane.

Said raw synthesis gas 13 is fed to the purification section 2, wherein carbon monoxide is converted into carbon dioxide to produce a shifted gas and said shifted gas is subjected to a carbon dioxide removal process, providing a purified gas 14 essentially containing hydrogen and a $CO_2$-containing tail gas stream 15. For example, said carbon dioxide removal process is a pressure swing adsorption (PSA) process using molecular sieves.

If appropriate, said purified gas 14 is mixed with nitrogen 16 from an air separation section (not shown) to provide an ammonia make-up gas 17. The make-up gas 17 is then compressed to the pressure of the synthesis section 4 within the multi-stage compressor 3.

The gas 17 thus obtained, together with a flow of hydrogen 18 recovered from the hydrogen-recovery unit 5, feeds the synthesis section 4. Said synthesis section produces ammonia 19 and a flow 20 of purge gas treated in the unit 5 for recovery of the hydrogen contained inside it.

The ammonia 19 splits into a first portion 21 and a second portion 22. Said first portion 21 is used, together with a tail gas 23 leaving the hydrogen-recovery unit 5, as fuel in one or more furnaces of the reforming section 1, for example in the burners of a primary reformer and/or in a charge pre-heater (not shown). The second portion 22 is exported. Optionally, a suitable small amount of natural gas 24 may also be used as fuel in the reforming section 1; however, it is preferably avoided to reduce $CO_2$ emissions.

Figure 2:
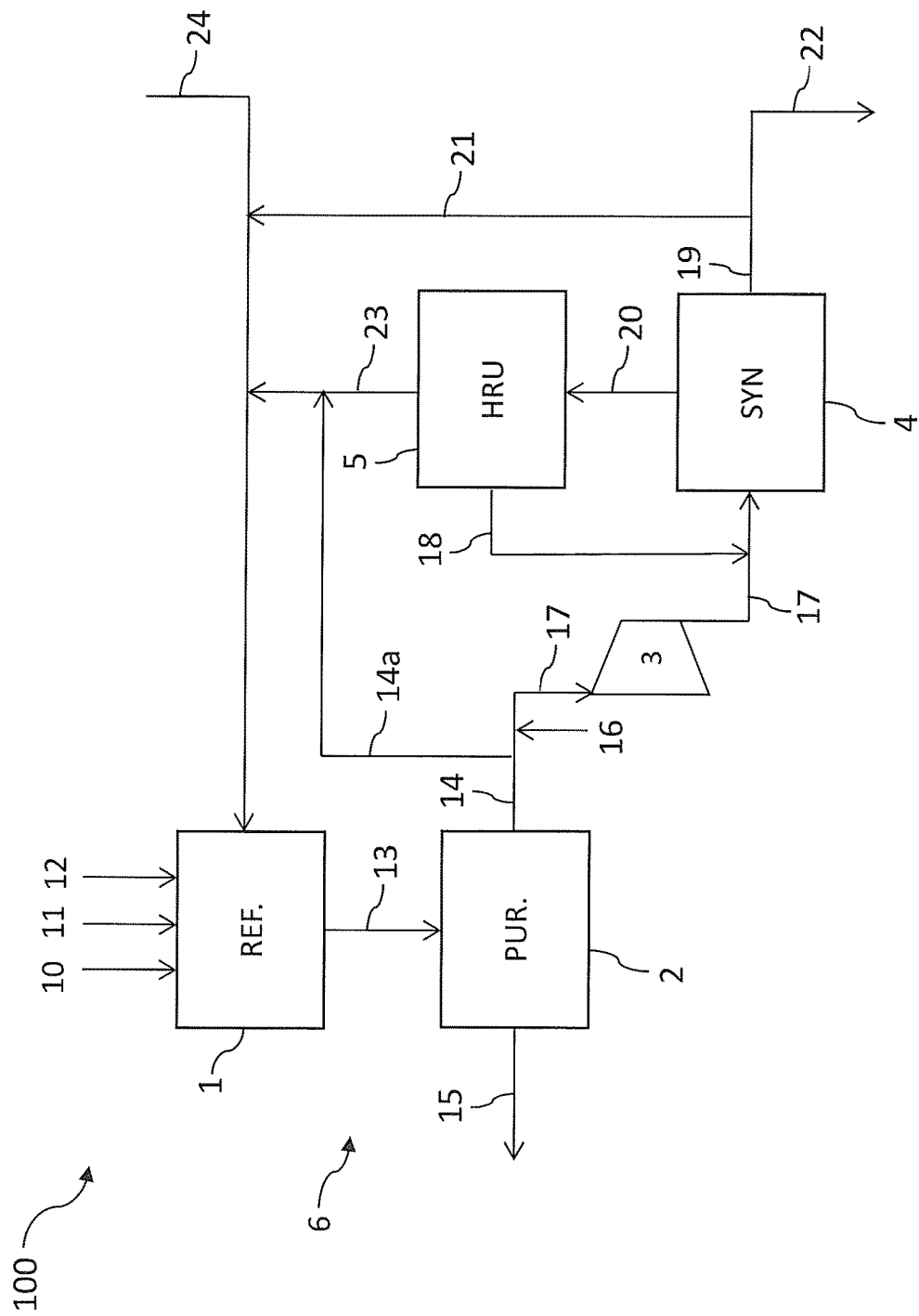
FIG. 2 shows a second embodiment of the invention.

FIG. 2 illustrates a block scheme of a plant 100 according to another embodiment of the invention. In this example, a portion 14a of the purified gas essentially containing hydrogen mixes with the tail gas 23 of the hydrogen-recovery unit 5 and is thus used as fuel in the reforming section 1.

EXAMPLE

The following Table 1 refers to an ammonia production process carried out in a front-end section and a synthesis section. Inside the front-end section, natural gas is converted into a synthesis gas and $CO_2$ is separated from said synthesis gas. The synthesis section produces an ammonia product and a purge stream, the latter being recovered for use as fuel in the front-end section. The front-end section requires further fuel, which comes from different sources according to the examples illustrated below.

Table 1 compares the overall consumption of natural gas, the fuel consumption breakdown and the ammonia production rate in the following processes:

1.1 Fuel requirement essentially provided by natural gas (prior art);
1.2 Fuel requirement essentially provided by ammonia, produced in the ammonia production process (embodiment of FIG. 1 of the invention);
1.3 Fuel requirement essentially provided by ammonia and a $CO_2$-depleted syngas, both produced in the ammonia production process (embodiment of FIG. 2 of the invention).

TABLE 1

|  |  | 1.1 | 1.2 | 1.3 |
|---|---|---|---|---|
| Overall NG consumption |  |  |  |  |
| NG feed (as LHV energy) | Gcal/h | 460 | 610 | 590 |
| NG fuel (as LHV energy) | Gcal/h | 90 | 0 | 0 |
| Total NG consumption, feed + fuel (as LHV energy) | Gcal/h | 550 | 610 | 590 |
| Fuel consumption breakdown |  |  |  |  |
| NG fuel (as LHV energy) | Gcal/h | 90 | 0 | 0 |
| Purge fuel (as LHV energy) | Gcal/h | 15 | 20 | 17 |
| Ammonia fuel (as LHV energy) | Gcal/h | 0 | 120 | 45 |
| $CO_2$ depleted syngas as fuel (as LHV energy) | Gcal/h | 0 | 0 | 65 |
| Ammonia production rate |  |  |  |  |
| Ammonia end product | t/h | 83 | 83 | 83 |
| Ammonia fuel consumption | t/h | 0 | 27 | 10 |
| Ammonia total production | t/h | 83 | 110 | 93 |

The processes according to embodiments of the invention (namely 1.2 and 1.3) eliminate the natural gas consumption as fuel. Accordingly, $CO_2$ stack emissions from natural gas fuel combustion are eliminated.

All processes 1.1, 1.2 and 1.3 have the same production rate of the ammonia end product, that is 83 t/h. However, the processes of the invention (namely 1.2 and 1.3) produce an excess of ammonia for use as fuel. In particular, process 1.2 makes about 32% more ammonia than process 1.1, while process 1.3 makes 12% more ammonia than process 1.1.

Surprisingly, the processes of the invention (namely 1.2 and 1.3) have only moderately higher natural gas consumption than the prior art, despite the low CO2 stack emissions and oversized production capacity. In particular, process 1.2 has +11% consumption and process 1.3 has +7% consumption.

Using ammonia fuel in combination with $CO_2$ depleted syngas, according to process 1.3, is advantageous both as regards total gas consumption and as regards total ammonia required production. Accordingly, process 1.3 consumes less gas and requires a smaller plant (i.e. lower plant cost) than process 1.2.

The invention claimed is:

1. A process, comprising:
producing a hydrogen-containing synthesis gas by conversion of a hydrocarbon feedstock;
wherein said process having a heat input provided by combustion of a plurality of process fuel streams; and
wherein said plurality of process fuel streams comprises at least one fuel stream of ammonia and combustion of said at least one fuel stream of ammonia is performed non-catalytically in at least one fired equipment.

2. The process of claim 1, wherein combustion of said at least one fuel stream of ammonia provides up to 50% of the total heat input of the process.

3. The process of claim 1, wherein combustion of said at least one fuel stream of ammonia provides up to 30% of the total heat input of the process.

4. The process of claim 1, wherein combustion of said at least one fuel stream of ammonia provides up to 15% of the total heat input of the process.

5. The process of claim 1, wherein said at least one fuel stream of ammonia is in a gaseous state or a vapour state.

6. The process of claim 1, wherein said plurality of process fuel streams comprises at least one fuel stream of ammonia which is supplied by a storage tank as trim fuel of the process, said trim fuel accounting for not more than 15% of the total combustion heat of the process.

7. The process of claim 1, wherein said plurality of process fuel streams comprises at least one fuel stream of ammonia which is supplied by a storage tank as trim fuel of the process, said trim fuel accounting for not more than 10% of the total combustion heat of the process.

8. The process of claim 1, wherein said plurality of fuel streams also includes a hydrogen-rich fuel stream.

9. The process of claim 8, wherein combustion of said hydrogen-rich fuel stream provides at least 50% of the total heat input of the process.

10. The process of claim 8, wherein combustion of said hydrogen-rich fuel stream provides at least 70% of the total heat input of the process.

11. The process of claim 8, wherein combustion of said hydrogen-rich fuel stream provides at least 85% of the total heat input of the process.

12. The process of claim 8, wherein said conversion of the hydrocarbon feedstock provides a raw product gas containing hydrogen, CO and $CO_2$, said raw product gas is purified by at least a step of $CO_2$ separation, after a shift reaction converting CO into $CO_2$, thus obtaining a $CO_2$-depleted synthesis gas, and wherein said hydrogen-rich fuel stream comprises, or consists of, a portion of said $CO_2$-depleted synthesis gas.

13. The process of claim 1, wherein said hydrogen-containing synthesis gas comprises hydrogen ($H_2$) and nitrogen ($N_2$) and is catalytically reacted in a synthesis loop to produce ammonia, and wherein said plurality of process fuel streams comprises a portion of the ammonia so produced.

14. The process of claim 13, wherein said plurality of process fuel streams further comprises at least one fuel stream of ammonia which is supplied by a storage tank, said storage tank being preferably filled with ammonia synthesized by the process.

15. The process of claim 13, wherein said synthesis loop also releases a purge stream containing unreacted synthesis gas and said plurality of process fuel streams further including at least one of: said purge stream or a portion thereof; a hydrogen-rich gas obtained after hydrogen recovery from said purge stream; a tail gas obtained after hydrogen recovery from said purge stream.

16. The process of claim 1, wherein said hydrogen-containing synthesis gas includes a mixture of carbon oxides and hydrogen, and said hydrogen-containing synthesis gas is catalytically reacted in a synthesis loop to produce methanol.

17. The process of claim 16, wherein said synthesis loop also releases a purge stream containing unreacted synthesis gas and said plurality of process fuel streams also includes a hydrogen-rich fuel stream, said hydrogen-rich fuel stream comprising or consisting of at least a portion of said purge stream, said at least a portion of purge stream being subjected to removal of at least part of carbon-containing compounds.

18. The process of claim 1, wherein the conversion of said hydrocarbon feedstock includes a step of reforming or of partial oxidation, said step of reforming including at least one of the following: a fired primary reforming, a gas heated reforming (GHR), an air- or oxygen-fired secondary reforming, or an auto-thermal reforming (ATR).

19. The process of claim 1, wherein said at least one fired equipment, where ammonia fuel is combusted, includes at least one of the following: a primary reformer, a feedstock pre-heater, an auxiliary steam generator, a desulphurization pre-heater, a steam superheater, a heat recovery steam generator, or a gas turbine.

20. The process of claim 1, wherein a portion of said at least one fuel stream of ammonia is decomposed to nitrogen ($N_2$) and hydrogen ($H_2$), the hydrogen so obtained acting as combustion promoter for the combustion of ammonia.

21. The process of claim 1, wherein said portion decomposed to nitrogen and hydrogen is not greater than 50% of the overall fuel stream of ammonia.

22. The process of claim 1, wherein said portion decomposed to nitrogen and hydrogen is not greater than 30% of the overall fuel stream of ammonia.

23. A process according to claim 1, including a use of said least one fuel stream of ammonia, in said at least one fired equipment, during a transient or a start-up phase.

24. A method for revamping a plant for synthesis of ammonia from a hydrocarbon feedstock, the plant including:
a front-end section including a reforming section for converting said hydrocarbon feedstock into a raw synthesis gas containing hydrogen, CO and $CO_2$, and a purification section providing a purified synthesis gas comprising hydrogen and nitrogen in a suitable ratio of about 3:1; and
a synthesis section for converting said purified synthesis gas into an ammonia product;
the method comprising:
separating a portion of the ammonia product and recycling said portion of the ammonia product to the front-end section for use of said ammonia as fuel in at least one fired equipment of said plant, wherein said ammonia fuel is combusted non-catalytically.

25. A method for start-up of a chemical plant for synthesis of ammonia, including non-catalytic combustion of ammonia in at least one fired equipment of the chemical plant during a start-up phase of the chemical plant.

* * * * *